Sept. 16, 1941.  A. H. SKAER  2,255,824
AIR-LINE LUBRICATOR FOR PNEUMATIC TOOLS
Filed Nov. 16, 1938
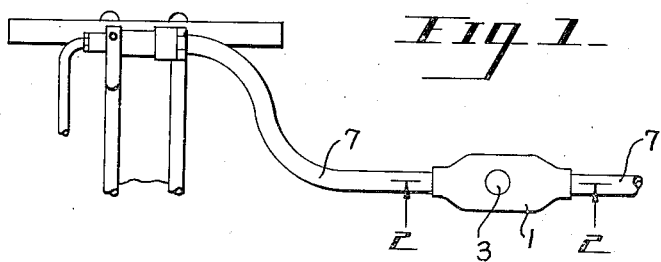
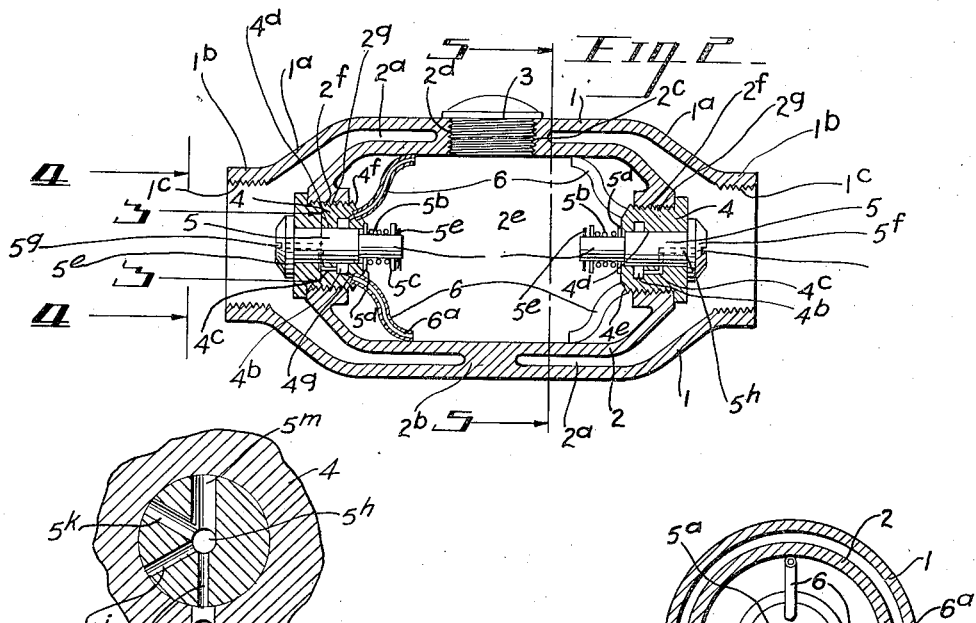
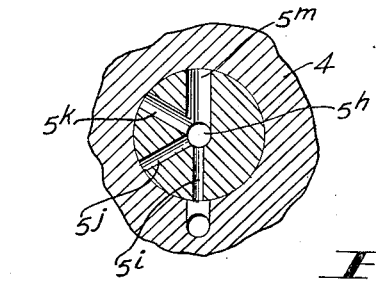
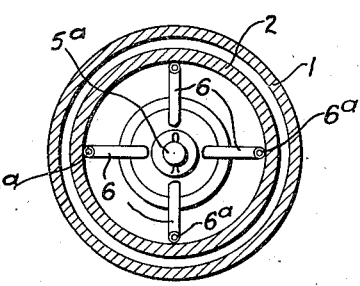
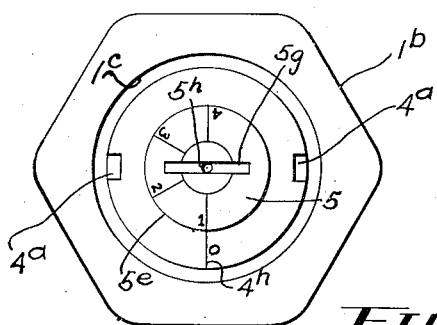
INVENTOR.
Arthur H. Skaer
BY A. B. Bowman
ATTORNEY.

Patented Sept. 16, 1941

2,255,824

UNITED STATES PATENT OFFICE 2,255,824

AIR-LINE LUBRICATOR FOR PNEUMATIC TOOLS

Arthur H. Skaer, Huntington Park, Calif., assignor to Independent Pneumatic Tool Co., Chicago, Ill., a corporation of Delaware Application November 16, 1938, Serial No. 240,771

5 Claims. (Cl. 184—55)

My invention relates to a lubricator to be positioned in the air line to pneumatic tools for carrying lubricants with the air supplied to the tool for lubricating the tool, particularly the parts contacted by the air and the objects of my invention are:

First, to provide a lubricator of this class in which a fine spray of oil is injected into the air in the air line in its passage to the air tools;

Second, to provide a lubricator of this class in which the quantity flow of the oil relative to the air flow may be easily adjusted and regulated;

Third, to provide a lubricator of this class which will substantially empty by automatic action of the air passage;

Fourth, to provide a lubricator of this class in which there is ejector action caused by the flow of the air for drawing the oil in spray form into the air in its passage;

Fifth, to provide a lubricator of this class which is reversible and will operate from either end, the parts being duplicates at the opposite ends of the lubricator; and Sixth, to provide a lubricator of this class which is very simple and economical of construction, easy to operate, easy to apply, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a diagrammatic view of my lubricator shown positioned in the air supply line to a pneumatic tool; Fig. 2 is an enlarged sectional view taken from the line 2—2 of Fig. 1 showing some of the parts and portions in elevation to facilitate the illustration; Fig. 3 is a sectional view on an enlarged scale taken from the line 3—3 of Fig. 2; Fig. 4 is an enlarged end view taken from the line 4—4 of Fig. 2 and Fig. 5 is a sectional view taken from the line 5—5 of Fig. 2.

Similar characters of reference refer to similar parts and portions throughout the several views of the drawing:

The outer casing member 1, inner casing member 2, filler plug 3, nozzle bushings 4, nozzle members 5, feed tubes 6 and air supply line 7 constitute the principal parts and portions of my air line lubricator for pneumatic tools.

The outer casing member 1 is hollow cylindrical in shape and provided with reduced ends 1a which gradually taper to hexagon shaped ends 1b which are internally threaded at 1c adapted to receive the threaded ends of the separate sections of the air feed line 7 as shown in Fig. 1 of the drawing.

Positioned inwardly of this outer casing member 1 is a similarly shaped inner casing member 2 which is spaced from the inner wall of the casing member 1 leaving a space 2a between the casings 1 and 2, and these casings 1 and 2 are secured together preferably integrally by means of connecting sections 2b and 2c which are round connecting sections, leaving passage for the air around said sections and through the space 2a. The section 2c and the members 1 and 2 are provided with a threaded opening 2d in which is screw threaded a filler plug 3. Through the opening in which this filler plug 3 is positioned the lubricating oil is positioned in the inside of the casings 2 in the chamber 2e. The opposite ends of the inner casing 2 are provided with flange portions 2f which are provided with central openings with screw threads 2g. Screw threaded in these openings 2g are the nozzle bushings 4 which are provided with flanged edges formed with spanner notches 4a on opposite sides as shown in Fig. 4 of the drawing. These bushings 4 are also provided with annular channels 4b which are oil conducting channels and communicating with these oil conducting channels in the bushings 4 are small oil conducting passages 4c which are provided with turns at their ends which extend inwardly toward the center of the members 4. These bushings 4 are also provided with a central bore 4d in which are revolubly mounted adjustable nozzle members 5. These nozzle members 5 are provided at their inner ends with reduced extended portions 5a upon which are mounted springs 5b interposed between washers 5c and 5d, the outer washers 5c being supported on the reduced portion 5a by means of cotter pins 5e, thus providing tension on the nozzle members 5. These nozzle members 5 are provided with heads 5f with slots 5g therein adapted to receive a screw driver or other member for turning the nozzle member 5 for adjusting. These members 5 are also provided with central longitudinally extending holes 5h which extend from these slots 5g inwardly some distance in the center of the members 5 and extending outwardly from this hole 5h is a plurality of varying sized holes 5i to 5m as shown best in Fig. 3 of the drawing, the channel 4c in the member 4 being large enough so that it is of the same area as the larger hole 5m in the member 5. The inner ends of the bushings 4 are provided with bevelled portions 4e in which are positioned holes 4f in which are secured the inner ends of the feed tubes 6 which are substantially S shape with holes therethrough of the same capacity as the holes 5m and 4c which holes are designated 6a and these holes 6a communicate with the channel portion 4b by means of holes 4g. This member 4 is also provided with an indicating line 4h which is adapted to coincide with the lines 1, 2, 3 and 4 on the head end of the member 5. These lines 1, 2, 3 and 4 are in alignment with the holes 5i, 5j, 5k and 5m in the member 5 shown best in Fig. 3 of the drawing and indicating the varying sized holes which gradually increase in size from 5i to 5m.

The operation of my air line lubricator for pneumatic tools is substantially as follows:

Oil is placed in the inner casing 2 through the opening in which the filler cap 3 is positioned, which is of the proper constituency to form a spray to be carried by the air in its passage to the pneumatic tool to be lubricated. The nozzle members 5 are adjusted by turning the members 5 by means of a screw driver or other similar tool so that the proper sized opening 5i to 5m registers with the opening 4c in the bushing members 4. Then with the air passing through the space 2a between the casing members 1 and 2, some of the air enters the holes 5h and passes through the passages 4c, annular passages 4b, then the holes 4g and through the feed tube 6 and forcing oil out through the opposite tube 6 at the opposite end taking the reverse direction outwardly through the openings 5h. At the same time the passage of air past the nozzle opening 5h forms an injection action which tends to draw the oil and spray the same in fine spray form which is absorbed by the air and passes to the tool to be lubricated. If more oil is required dependent upon the tool to be lubricated and the pressure of air, the members 5 may be turned so that the holes 5j, 5k or 5m register with the openings 4c, varying the quantity of oil sprayed into the air supply line for lubrication purposes.

Though I have shown and described a particular construction, combination and arrangement of parts and portions, I do not wish to be limited to this particular construction, combination, and arrangement but desire to include in the scope of my invention the construction, combination and arrangement substantially as set forth in the appended claims.

Having thus described my invention, what I claim as new and desire to secure by Letters Patent is:

1. In an air line lubricator for pneumatic tools of the class described, the combination of a pair of hollow cylindrical casings one placed within the other in spaced relation to each other and rigidly connected, a filling opening communicating from the exterior of the outer casing to the interior of the inner casing and a plurality of varying sized adjustable passage means in each extended end of the inner casing.

2. In an air line lubricator for pneumatic tools of the class described, the combination of a pair of hollow cylindrical casings one placed within the other in spaced relation to each other and rigidly connected, a filling opening communicating from the exterior of the outer casing to the interior of the inner casing and a plurality of varying sized adjustable passage means in each extended end of the inner casing including a plurality of tubes at both ends extending to near the inner side of said inner casing member.

3. In an air line lubricator for pneumatic tools of the class described, the combination of an outer air passage casing, an inner oil container in spaced relation internally thereof, passage defining means in opposite ends of said inner oil container communicating with the interior thereof and shiftably mounted variable sized passage defining means in communicative relation with said first mentioned passage defining means and communicating with the interior of said outer casing at each end of said inner oil container outwardly thereof.

4. In an air line lubricator for pneumatic tools of the class described, the combination of an outer air passage casing, an inner casing in spaced relation internally thereof, a revoluble nozzle member provided with variable sized passage openings positioned in each end of said inner casing and passage defining means communicating with one only of said variable sized passage openings and with the interior of said inner casing at each end.

5. In an air line lubricator for pneumatic tools of the class described, the combination of an outer air passage casing, an inner casing in spaced relation internally thereof, a revoluble nozzle member provided with variable sized passage openings positioned in each end of said inner casing, passage defining means communicating with one only of said variable sized passage openings and with the interior of said inner casing at each end, and single passage defining means communicating with said variable sized passage openings and the outer end of said nozzle member.

ARTHUR H. SKAER.